Dec. 20, 1966   W. W. CHAMBERS   3,293,539
VARIABLE FULL-WAVE POWER CONTROL CIRCUIT
Filed Jan. 25, 1963

INVENTOR.
WILLIAM W. CHAMBERS
BY FOWLER & KNOBBE
ATTORNEYS

United States Patent Office 3,293,539
Patented Dec. 20, 1966

3,293,539
VARIABLE FULL-WAVE POWER
CONTROL CIRCUIT
William W. Chambers, Anaheim, Calif., assignor to
Robertshaw Controls Company, a corporation of
Delaware
Filed Jan. 25, 1963, Ser. No. 253,799
1 Claim. (Cl. 323—22)

The present invention relates generally to an improved circuit for controlling the magnitude of full-wave power delivered to a load from an alternating current source.

Circuits for controlling full-wave power may be used advantageously for such purposes as controlling heating and cooling sources, for light dimming controls, and for controlling the speed of alternating current induction motors. A specific example is controlling the speed of a split-phase, capacitor-start motor, driving the blower of a furnace, in response to changes in furnace plenum temperature.

The controlled rectifier is a preferred component for use in power control circuitry. This semiconductor element requires no filament current nor high supply voltages. Moreover, these devices and particularly silicon controlled rectifiers have very high power handling capacities, e.g. units are currently available with capacities of over 50 amperes. These desirable characteristics are derived from the particular structure and operation of the controlled rectifier which comprises a four region semiconductor diode including anode and cathode connections to respective outer regions and a control electrode connected to one of the inner regions. A small current delivered to the control electrode controls the point at which the diode fires or conducts for positive half-cycles of the alternating current input. When the device is fired, it has a very low impedance between its anode and cathode electrodes; otherwise, it has a very high impedance therebetween. For a more detailed explanation of the structure and function of the controlled rectifier, reference is made to this inventor's copending application entitled, "Temperature Control Circuit," Serial No. 247,674, filed December 27, 1962 and assigned to Robertshaw-Fulton Controls Company, assignee of the present invention; the article entitled "The Electrical Characteristics of Silicon P-N-P-N Triodes" by I. N. Mackintosh, published in the proceedings of the I.R.E., June 1948, p. 1229; and the article entitled "Multiterminal P-N-P-N Switches" by R. W. Aldrich and N. Holonyak, Jr., published in the same issue of the I.R.E. proceedings at p. 1236.

While offering the advantages noted above, the controlled rectifier presents definite problems in the control of full-wave currents since the device is reverse biased and nonconductive for each negative half-cycle of the input alternating current power. A solution of this problem taught by the prior art involves using two controlled rectifiers connected "back to back." The use of two controlled rectifiers, however, adds both cost and complexity since individual control circuits are required for each of the control electrodes.

It is an object of the present invention to provide a full-wave power control circuit employing only a single controlled rectifier.

Another object of this invention is to provide an improved variable power control circuit particularly adapted for controlling the speed of an alternating current induction motor.

Other and further objects, features and advantages of the invention will become apparent as the description proceeds.

Briefly, in accordance with a preferred form of the present invention, a full-wave power control circuit includes a reactor comprising a saturable core and winding connected in parallel with anode and cathode electrodes of a controlled rectifier. This parallel combination is connected in series with the alternating current power source and the load. The power supplied to the load is determined by the firing of the controlled rectifier which in turn is determined by the value of control current supplied its control electrode. For minimum power to the load, the controlled rectifier is not fired; the load current is then dependent upon the characteristics of the saturable reactor. For intermediate power values, the controlled rectifier is fired for only a portion of each positive half-cycle. The previously biased reactor is saturated and offers a low impedance between the power source and load for a portion of each negative half-cycle. Until saturated, the reactor presents a high impedance between the power source and load. For high power values, the controlled rectifier is fired for substantially all of each positive half-cycle. During each negative half-cycle, the saturable reactor remains saturated during all or substantially all of the half-cycle thus providing a low impedance between the power source and load for the entire negative half-cycle.

A more thorough understanding of the invention may be obtained by a study of the following detailed description taken in connection with the accompanying drawings.

Figure 1:
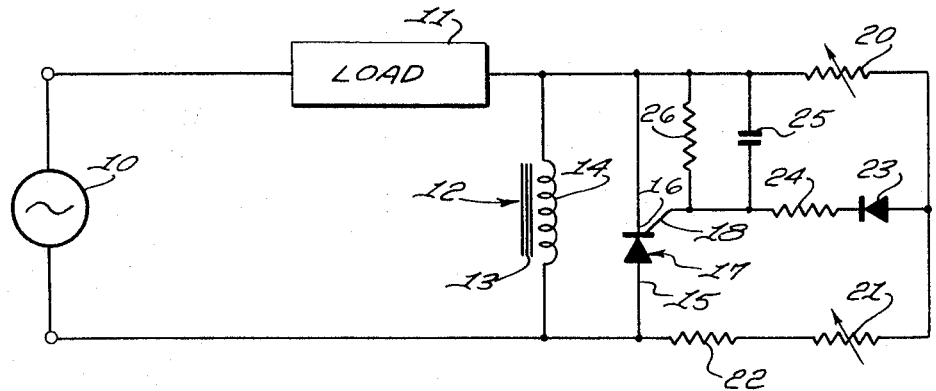
FIG. 1 is a circuit schematic for a variable full-wave power control circuit constructed in accordance with this invention.
Figure 3:
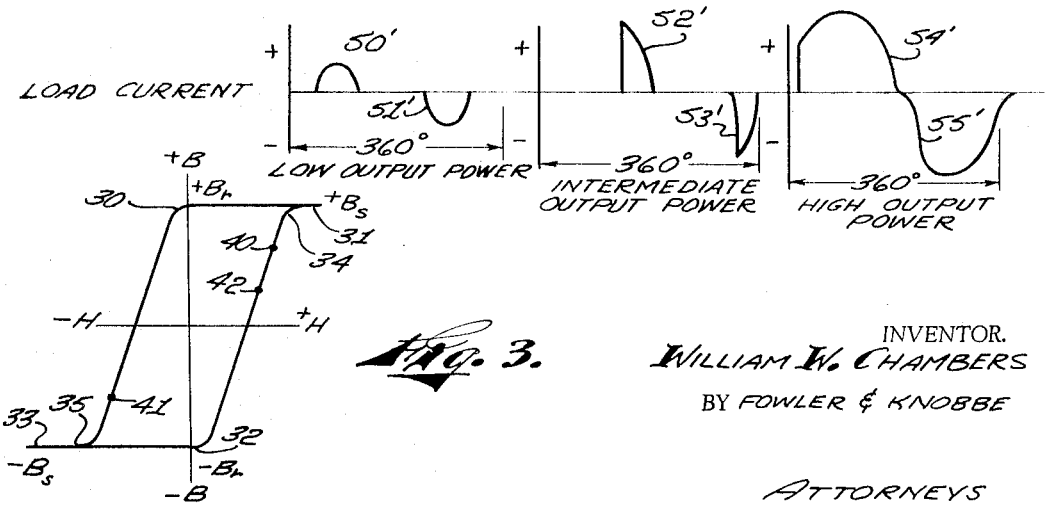
FIG. 3 illustrates a representative hysteresis loop of a magnetic material which is preferably employed in the saturable reactor of the invention.

Referring now to FIG. 1, a variable full-wave power control circuit is shown for controlling the amount of power delivered from alternating current source 10 to load 11. The control circuitry includes a saturable reactor 12 including a saturable core 13 and winding 14 connected in parallel with the anode electrode 15 and cathode electrode 16 of controlled rectifier 17. As shown, the parallel combination is connected in series between source 10 and load 11. The core 13 preferably exhibits the substantially rectangular hysteresis loop shown in FIG. 3. Such cores may be made of a variety of materials and formed in a number of geometric configurations. A specific example of a preferred core material is 3% silicon steel, this material being rolled only in a particular direction and annealed in hydrogen to grain orient the material.

The power delivered to the load is determined by the firing of the controlled rectifier. Current supplied to the control electrode 18 of the controlled rectifier 17 regulates the firing and resulting flow of anode-cathode current for forward anode-cathode bias. The anode-cathode current is blocked when the device is reverse biased.

The current supplied the control electrode is determined by the variable resistor 20 connected at the upper portion of a voltage divider network. The lower portion of the voltage divider comprises rheostat 21 and limiter resistor 22. The variable resistance 20 may be either an adjustable rheostat or it may be a thermistor having a positive temperature coefficient of resistivity in those systems in which the power delivered to the load is determined by a predetermined temperature within a given environment. For example, variable resistor 20 may be a positive temperature coefficient thermistor positioned to respond to changes in furnace plenum temperature and load 11 may be a split-phase capacitor-start motor. The speed of the motor will then be controlled in accordance with the plenum temperature. Or, the variable resistor 20 may be a lamp dimming rheostat and the load 10 a lamp or a group of lamps, the brilliance of which is controlled by the rheostat position. If resistor 20 is a temperature responsive element, rheostat 21 may be used to vary the temperature range at which power is delivered to load 11. If on the other hand resistor 20 is a rheostat, the resistor 21 may be used as the sensor or controlling element. In this arrangement, limiter 22 is preferably located in series with rheostat 20.

The voltage developed across the gate-cathode portion of the voltage divider circuit is used as the gating voltage for the controlled rectifier 17. This gating voltage provides a controlled current to the controlled rectifier through a diode 23 and current limiting resistor 24. Diode 23 and resistor 24 in combination with capacitor 25 also serve as a phase shifting means wherein the unidirectional conduction of the diode permits voltage build up in the capacitor so that the conductive angle of the rectifier can be made to vary from slightly more than 0° to slightly less than 180° of the input wave form. Because the conductive angle approaches, but never reaches 0°, the delivered power will show a step increase at initial firing of the controlled rectifier. Minimum conduction angle through the controlled rectifier, hence minimum power, is an inverse function of the capacitor value. Bleed resistor 26 completes the circuitry and facilitates discharge of the capacitor during the negative half-cycle of input voltage. This phase shifting means is taught and claimed in this inventor's copending application entitled "Temperature Control Arrangements," Serial No. 223,984, filed September 17, 1962, and assigned to Robertshaw-Fulton Controls Company.

The operation of the circuit of FIG. 1 is such that saturable reactor 12 delivers current to the load 11 for half-cycles of a predetermined polarity, more particularly those half-cycles which reverse bias the controlled rectifier 17. During the opposite half-cycles, for all except minimum power delivery, the controlled rectifier delivers the current to the load 11 from source 10. This operation enables a full-wave control over the alternating current power delivered the load 11 by means of only the single controlled rectifier 17. Representative circuits constructed in accordance with this invention provide an adjustment of output level from approximately 15% of deliverable line power to about 85% of deliverable line power (deliverable line power being that which would be supplied to the same load without the control circuit).

The saturable reactor 12 also determines the minimum power delivered to load 11 from source 10. Referring now to the hysteresis loop shown in FIG. 3, it will be noted that the curve exhibits several significant points of operation, namely, point 30 ($+B_r$) which represents plus remanence; the point 31 ($+B_s$) which represents plus saturation; the point 32 ($-B_r$) which represents minus remanence; the point 33 ($-B_s$) which represents minus saturation; and the point 34, 35 which represent respectively the beginnings of the regions of positive and negative saturation flux density. It is well known that a magnetic core produces a changing magnetic flux when a voltage is applied to a winding supported on the core. If sufficient voltage is applied to the winding for an adequate period of time, the core becomes magnetically saturated. The core becomes negatively magnetically saturated when a voltage of a first polarity is applied to the winding on the core for a particular period of time. The core becomes positively saturated when the same voltage of the opposite polarity is applied to the winding for the same length of time. Accordingly, a predetermined value of volt-seconds is required to saturate the core in either a positive or negative direction.

During the time that a core is not saturated, it produces increased amounts of magnetic flux as a voltage of one polarity is applied. For core materials exhibiting a substantially rectangular hysteresis loop, small increases in current may cause large increases in the rate of change of magnetic flux. Because of the large increase in voltage required to produce a small increase in current, the impedance presented by the winding of a saturable reactor may be relatively large during periods of core unsaturation. When a core becomes magnetically saturated, increases in current through its associated windings produce substantially no increase in magnetic flux. Because of the lack of any increase in flux in the core, no voltage is induced in the winding which then has substantially zero impedance.

For low power delivery to the load 11, the ohmic value of resistance 20 is low with respect to the ohmic value of the rheostat 21 and limiting resistor 22. The control voltage and current are then less than are required to trigger the controlled rectifier and all of the delivered power comes through the saturable reactor 12. Low power delivery is thus a function of the difference between the line voltage supplied by source 10 and that which can be supported by the reactor. For minimum power, the reactor is selected to remain unsaturated when connected across the line potential. The magnetic flux density then does not reach either the point 34 or 35 of the hysteresis loop. The inductive impedance of the reactor accordingly remains high throughout the complete cycle of alternating current and very low currents are supplied to the load. For somewhat higher minimum power delivery, the reactor used is such that the saturation magnetic flux densities are achieved for a predetermined portion of each half-cycle of the alternating current wave form. For example, the minimum power may be increased by lowering the reactance of the saturable reactor. This may be accomplished, for example, by reducing the number of turns in winding 14. Saturation of the core in this manner will not effect the operation of the controlled rectifier for power levels above minimum power since the voltage developed across the reactor will be greater under all normal operation conditions than that required to fire the controlled rectifier when biased on.

Figure 2:
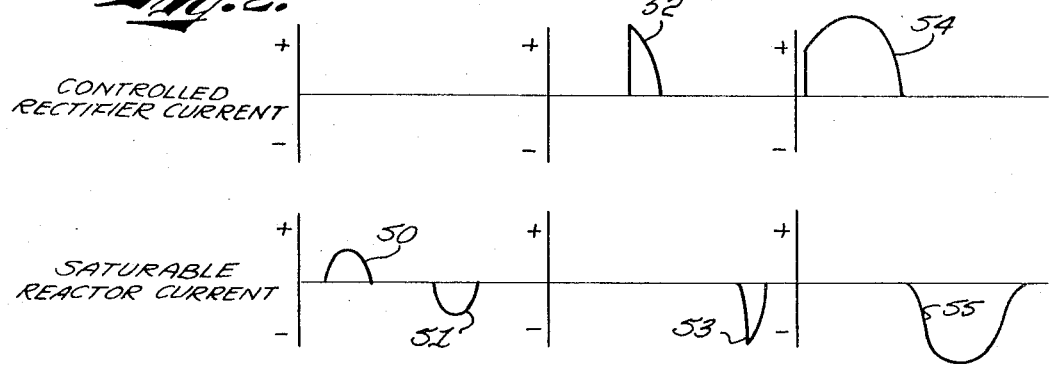
FIG. 2 illustrates the currents through the controlled rectifier, the saturable reactor and load for low output power, intermediate output power and high output power for the circuit of FIG. 1.

Curves 50, 51 and 50', 51' of FIG. 2 illustrate respectively the reactor and load currents for low power delivery. The reactor current shown is produced when the reactor saturates for a brief portion of each half cycle of the applied alternating current waveform. As described above, the controlled rectifier does not fire for low power conditions; accordingly, the current therethrough is substantially zero as shown.

All power levels above minimum are delivered to load 11 by increasing the magnitude of variable resistance 20 so that the controlled rectifier is fired for a portion of each positive half-cycle. The current through the controlled rectifier for a representative cycle is shown by curve 52 of FIG. 2 wherein current flows through the controlled rectifier for a portion of the positive half-cycle and zero current flows through the controlled rectifier for the negative half-cycle. During the portion of the alternating current waveform when the controlled rectifier is fired, the voltage across the reactor is quite low (only the small voltage drop through the controlled rectifier); accordingly, the volt-seconds applied thereto during the positive half-cycle are lower than when the controlled rectifier remains untriggered. For example, the magnetic flux density may reach only point 40 or 42 of FIG. 3 during the positive half-cycle. The reactor thus is biased non-symmetrically magnetically when the controlled rectifier is fired, the magnitude of volt-seconds supplied thereto during the positive polarity half-cycle being inverse to the time period said controlled rectifier is fired. As a result, during the negative half-cycle fewer volt-seconds are required to reach negative saturation point 35 and saturate the core (commonly known as resetting the core) with the result that a higher current flows through the reactor 12 to the load, as shown by curve 53 of FIG. 2, than in the preceding illustration wherein the controlled rectifier was untriggered. The resultant current through the load 11 is a full-wave current comprising the positive and negative current values 52', 53' of FIG. 2.

For high power delivery between the source 10 and load 11, the ohmic resistance of variable resistance 20 is further increased so that the controlled rectifier is fired for substantially all of each positive half-cycle. During the positive half-cycle, very few volt-seconds are supplied reactor 12. In effect, the reactor sees only a direct current and remains saturated at or near point 33 throughout the entire cycle of alternating current. Thus, a low impedance is presented by the controlled rectifier for the positive portion of the alternating current and by the reactor for the negative portion thereof with the resultant high load currents 54′, 55′ corresponding to the controlled rectifier current 54 and reactor current 55.

Control circuits constructed as shown have been found to supply substantially symmetric waveforms to the load even though the current thereto is determined by the characteristics of the two different type circuit components. As shown in FIG. 2, the enhanced conductivity of the reactor occurs during approximately the same portion of the negative half-cycle, and in a negative direction, as the controlled rectifier conducted during the positive half-cycle. By combining these two conducting periods, the effective output has an alternating current waveform and is approximately symmetric about the zero voltage line. The waveforms are of slightly different shape since the voltage changes at the load due to the firing of the controlled rectifier occur sharply and rise rapidly, while those occurring during the reactor conduction have a less well-defined rise.

The particular current waveforms shown in FIG. 2 are for a resistive type load. The waveforms will be more distorted for loads having reactive impedance; however, the power delivered will still be substantially symmetrical for the positive and negative half-cycles.

Although an exemplary embodiment of this invention has been disclosed and discussed, it will be understood that other applications of the invention are possible and that the embodiments disclosed may be subjected to various changes, modifications, and substitutions without necessarily departing from the spirit of the invention.

I claim:

A circuit for controlling the full-wave power delivered from an alternating current source to a load comprising
 a saturable reactor including a saturable core and winding,
 a controlled rectifier having its anode and cathode electrodes connected to said winding,
 a voltage divider connected to said winding including series connected resistors, one of the resistors being a thermistor, and
 means connecting the control electrode of said control rectifier to the point between said resistors, said control electrode being responsive to a current of a predetermined magnitude to cause firing of said controlled rectifier and conduction between said anode and cathode electrodes.

References Cited by the Examiner

UNITED STATES PATENTS

| | | | |
|---|---|---|---|
| 2,054,496 | 9/1936 | Craig | 323—86 X |
| 2,939,064 | 5/1960 | Momberg | 318—246 |
| 3,136,941 | 6/1964 | Marlow | 323—89 |

OTHER REFERENCES

Glasberg: "Silicon Controlled Rectifiers," Electromechanical Components and Systems Design, March 1962, pages 19 and 23.

JOHN F. COUCH, *Primary Examiner.*

K. D. MOORE, *Assistant Examiner.*